United States Patent
Leppänen et al.

(10) Patent No.: US 10,999,412 B2
(45) Date of Patent: May 4, 2021

(54) SHARING MEDIATED REALITY CONTENT

(71) Applicant: Nokia Technologies Oy, Espoo (FI)

(72) Inventors: Jussi Leppänen, Tampere (FI); Antti Eronen, Tampere (FI); Arto Lehtiniemi, Lempäälä (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 203 days.

(21) Appl. No.: 15/746,681

(22) PCT Filed: Jul. 15, 2016

(86) PCT No.: PCT/FI2016/050522
§ 371 (c)(1),
(2) Date: Jan. 22, 2018

(87) PCT Pub. No.: WO2017/021587
PCT Pub. Date: Feb. 9, 2017

(65) Prior Publication Data
US 2018/0219975 A1  Aug. 2, 2018

(30) Foreign Application Priority Data

Aug. 4, 2015 (EP) .................................... 15179736

(51) Int. Cl.
*G06F 15/16* (2006.01)
*H04L 29/06* (2006.01)
(Continued)

(52) U.S. Cl.
CPC .......... *H04L 67/38* (2013.01); *G02B 27/0093* (2013.01); *G02B 27/017* (2013.01);
(Continued)

(58) Field of Classification Search
CPC ... H04L 67/38; H04L 65/4076; G02B 27/017; G06F 3/011; G06F 3/04845
(Continued)

(56) References Cited

U.S. PATENT DOCUMENTS 9,978,178 B1 * 5/2018 Shepard .................... G06F 3/00
2005/0226166 A1 10/2005 Agrawal et al.
(Continued)

FOREIGN PATENT DOCUMENTS

CN   102568026 A   7/2012
CN   102595228 A   7/2012
(Continued)

OTHER PUBLICATIONS

"Digital Foundry: hands-on with Project Morpheus", Eurogamer, Retrieved on Jan. 18, 2018, Webpage available at : http://www.eurogamer.net/articles/digitalfoundry-2014-hands-on-with-project-morpheus.

(Continued)

*Primary Examiner* — David R Lazaro
*Assistant Examiner* — Mariegeorges A Henry
(74) *Attorney, Agent, or Firm* — Alston & Bird LLP

(57) ABSTRACT

A method, apparatus and computer program code are provided. The method comprises: causing display of mediated reality content by one or more displays associated with a device; identifying a further device with which at least a portion of the mediated reality content is to be shared; determining one or more parameters characterizing one or more displays associated with the further device; determining at least a portion of the mediated reality content to be shared with the further device based, at least in part, on the determined one or more parameters; and causing the portion of the mediated reality content to be shared with the further device.

20 Claims, 10 Drawing Sheets

(51) Int. Cl.

| | |
|---|---|
| *G02B 27/01* | (2006.01) |
| *G06F 3/01* | (2006.01) |
| *G06T 19/00* | (2011.01) |
| *G06F 3/14* | (2006.01) |
| *G06F 3/0481* | (2013.01) |
| *G02B 27/00* | (2006.01) |
| *G06F 3/0484* | (2013.01) |
| *H04N 7/15* | (2006.01) |

(52) U.S. Cl.
CPC ............. *G06F 3/011* (2013.01); *G06F 3/012* (2013.01); *G06F 3/04815* (2013.01); *G06F 3/04845* (2013.01); *G06F 3/1454* (2013.01); *G06T 19/006* (2013.01); *H04L 65/4076* (2013.01); *G02B 2027/0134* (2013.01); *G02B 2027/0178* (2013.01); *G02B 2027/0187* (2013.01); *G06F 2203/04806* (2013.01); *G09G 2340/045* (2013.01); *G09G 2340/0464* (2013.01); *G09G 2354/00* (2013.01); *G09G 2370/04* (2013.01); *H04N 7/157* (2013.01)

(58) Field of Classification Search
USPC ............................................ 709/231; 348/52
See application file for complete search history.

(56) References Cited

U.S. PATENT DOCUMENTS

| | | |
|---|---|---|
| 2006/0023063 A1 | 2/2006 | Okawa |
| 2012/0019433 A1 | 1/2012 | Inagaki |
| 2012/0147036 A1* | 6/2012 | Yoshikawa ....... H04M 1/72527 |
| | | 345/629 |
| 2012/0177067 A1 | 7/2012 | Cho et al. |
| 2012/0210254 A1 | 8/2012 | Fulaichi et al. |
| 2012/0274750 A1* | 11/2012 | Strong ................. G01C 21/165 |
| | | 348/52 |
| 2013/0257627 A1* | 10/2013 | Rafael ................ G05B 19/0426 |
| | | 340/691.6 |
| 2015/0193979 A1 | 7/2015 | Grek |
| 2018/0084284 A1* | 3/2018 | Rosewarne ............ H04N 19/91 |

FOREIGN PATENT DOCUMENTS

| | | |
|---|---|---|
| CN | 102695032 A | 9/2012 |
| JP | 2005-049996 A | 2/2005 |
| JP | 2005-099064 A | 4/2005 |
| JP | 2006039919 A | 2/2006 |
| JP | 2012028950 A | 2/2012 |
| JP | 2015-064841 A | 4/2015 |
| WO | 2014/115393 A1 | 7/2014 |

OTHER PUBLICATIONS

Extended European Search Report received for corresponding European Patent Application No. 15179736.2, dated Dec. 18, 2015, 8 pages.
International Search Report and Written Opinion received for corresponding Patent Cooperation Treaty Application No. PCT/FI2016/050522, dated Oct. 5, 2016, 13 pages.
Office Action received for corresponding European Patent Application No. 15179736.2, dated Nov. 26, 2018, 6 pages.
Office Action received for corresponding Japanese Patent Application No. 2018-504968, dated Feb. 27, 2019, 4 pages of office action and 4 pages of Translation available.
Office Action received for corresponding Japanese Patent Application No. 2018-504968, dated Jul. 17, 2019, 5 pages of office action and 3 pages of Translation available.
Office Action received for corresponding European Patent Application No. 15179736.2, dated Sep. 23, 2019, 11 pages.
Office Action for Chinese Application No. 201680045475X dated May 22, 2020, 16 pages.
Summons to Attend Oral Proceedings for European Application No. 15 179 736.2 dated Jun. 19, 2020, 27 pages.

* cited by examiner

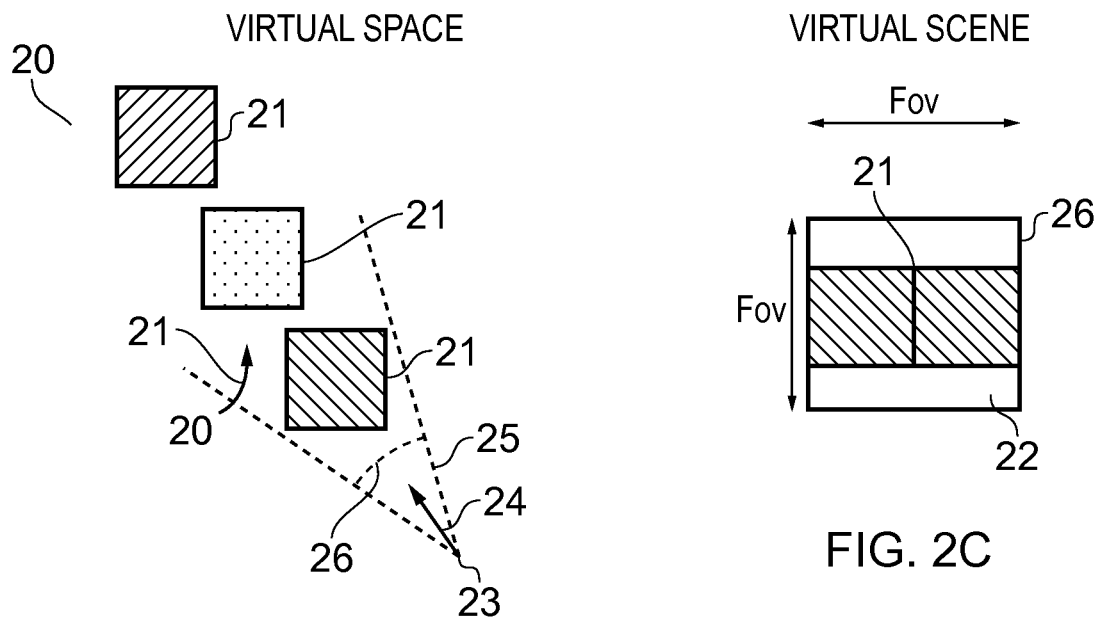
FIG. 1C
FIG. 2C
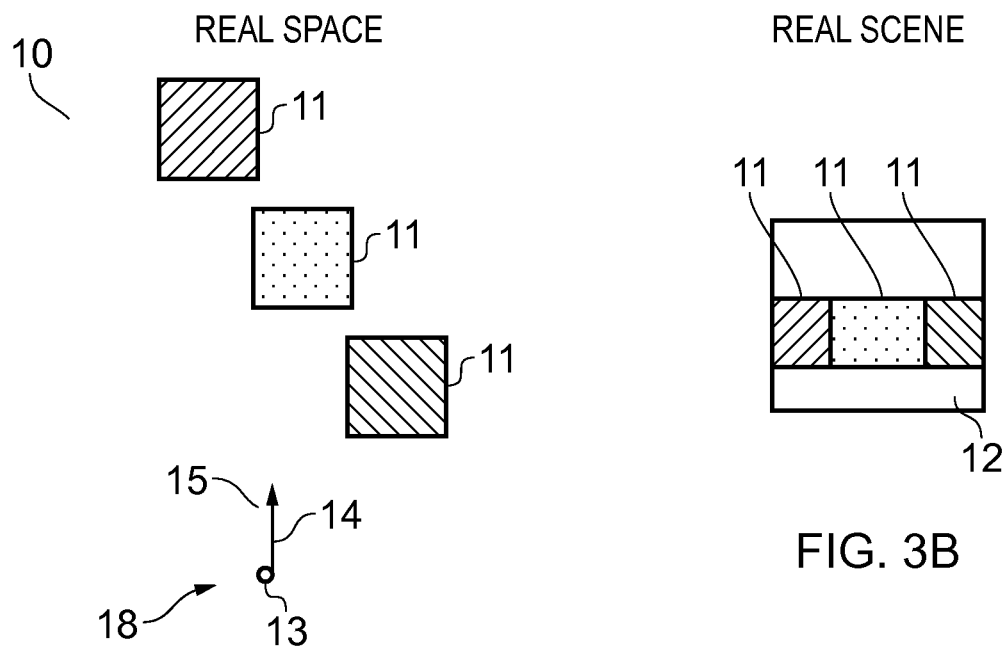
FIG. 3A
FIG. 3B

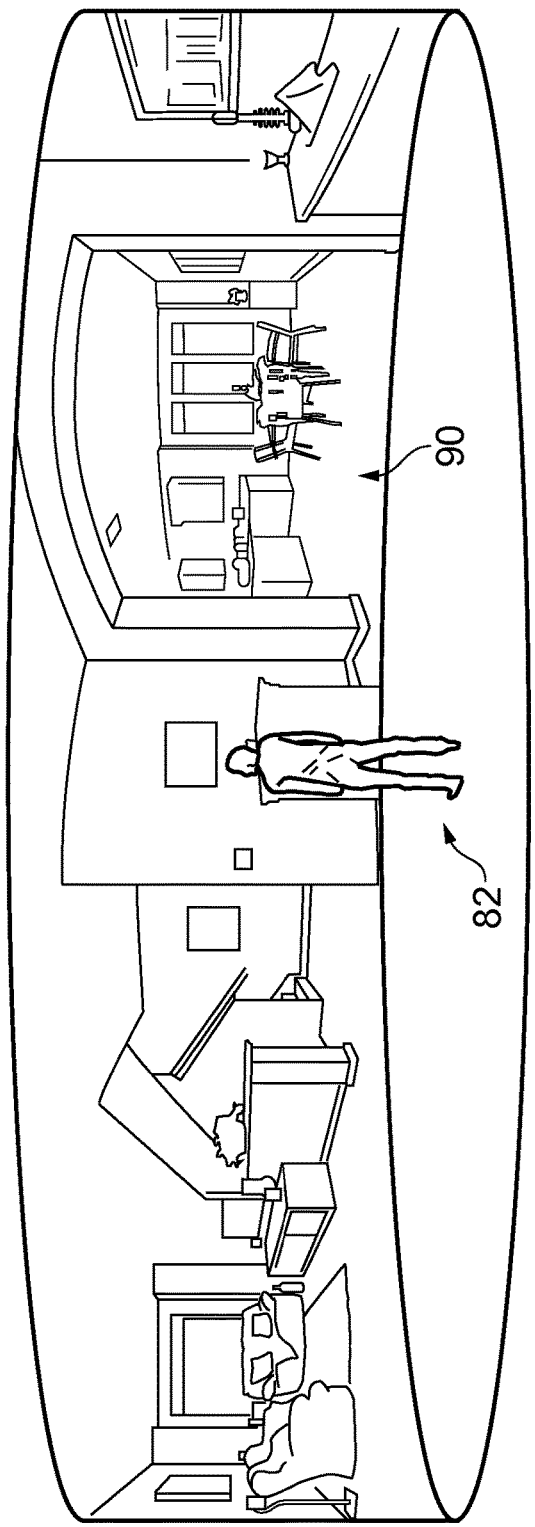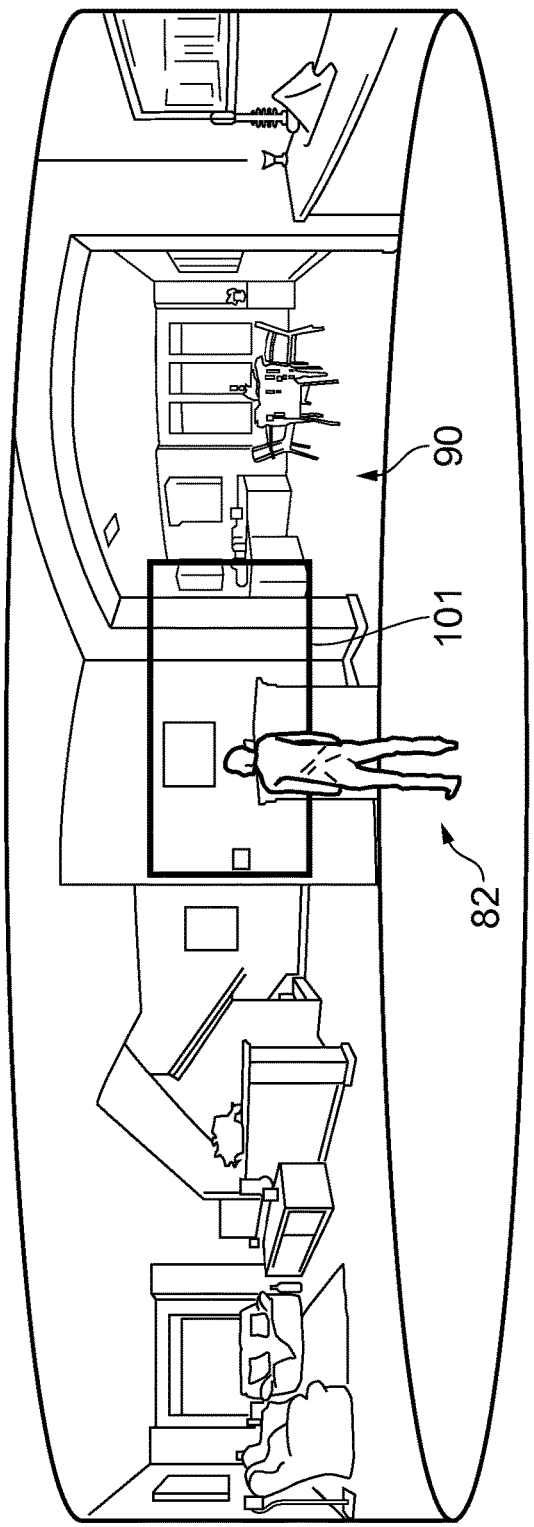

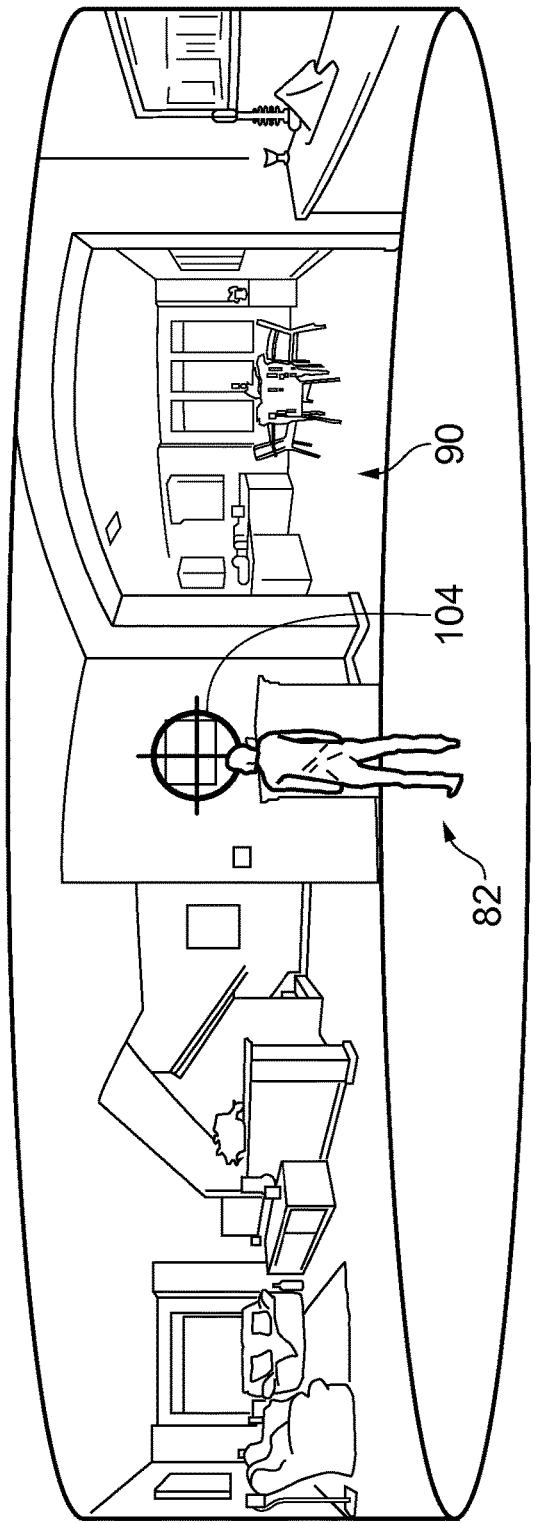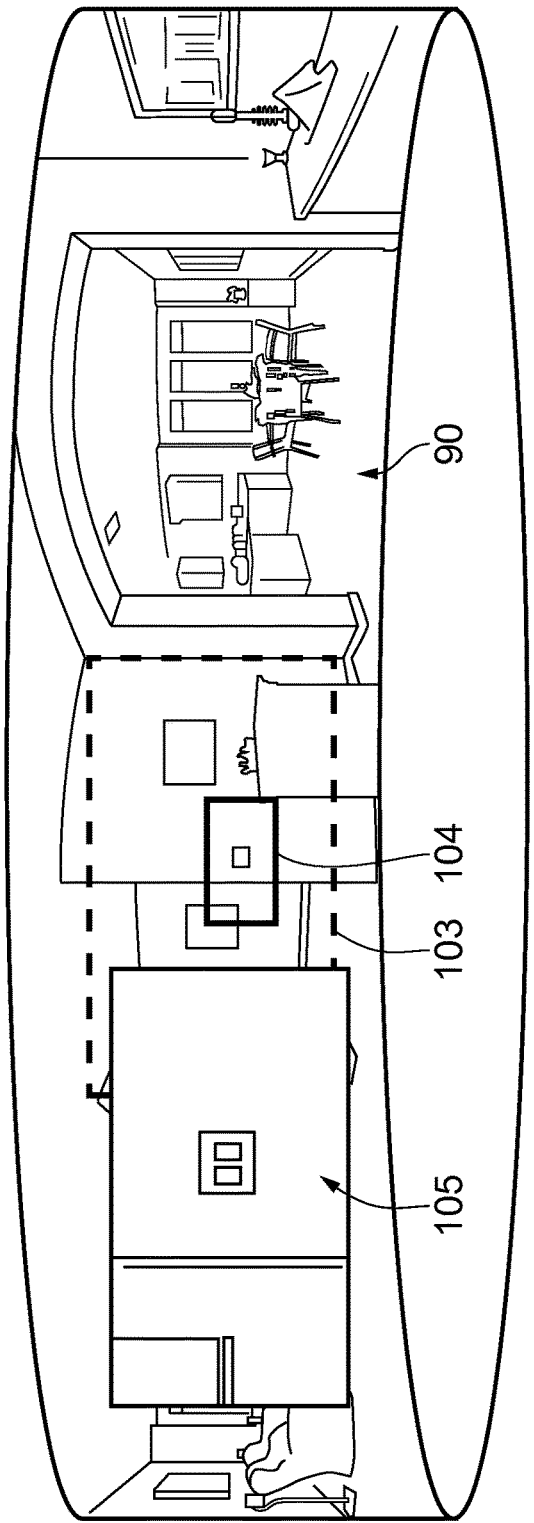

SHARING MEDIATED REALITY CONTENT

RELATED APPLICATION

This application was originally filed as Patent Cooperation Treaty Application No. PCT/FI2016/050522 filed Jul. 15, 2016 which claims priority benefit to European Patent Application No. 15179736.2, filed Aug. 4, 2015.

TECHNOLOGICAL FIELD

Embodiments of the present invention relate to sharing mediated reality content such as augmented reality content or virtual reality content.

BACKGROUND

Mediated reality in this document refers to a user experiencing a fully or partially artificial/virtual environment.

Augmented reality is a form of mediated reality in which a user experiences a partially artificial, partially real environment. Virtual reality is a form of mediated reality in which a user experiences a fully artificial/virtual environment.

BRIEF SUMMARY

According to various, but not necessarily all, embodiments of the invention there is provided a method, comprising: causing display of mediated reality content by one or more displays associated with a device; identifying a further device with which at least a portion of the mediated reality content is to be shared; determining one or more parameters characterizing one or more displays associated with the further device; determining at least a portion of the mediated reality content to be shared with the further device based, at least in part, on the determined one or more parameters; and causing the at least a portion of the mediated reality content to be shared with the further device.

According to various, but not necessarily all, embodiments of the invention there is provided computer program code that, when performed by at least one processor, causes at least the following to be performed: causing display of mediated reality content by one or more displays associated with a device; identifying a further device with which at least a portion of the mediated reality content is to be shared; determining one or more parameters characterizing one or more displays associated with the further device; determining at least a portion of the mediated reality content to be shared with the further device based, at least in part, on the determined one or more parameters; and causing the at least a portion of the mediated reality content to be shared with the further device.

One or more computer programs may comprise the computer program code. The one or more computer programs may be stored on one or more non-transitory computer readable mediums.

According to various, but not necessarily all, embodiments of the invention there is provided an apparatus, comprising: means for causing display of mediated reality content by one or more displays associated with a device; means for identifying a further device with which at least a portion of the mediated reality content is to be shared; means for determining one or more parameters characterizing one or more displays associated with the further device; means for determining at least a portion of the mediated reality content to be shared with the further device based, at least in part, on the determined one or more parameters; and means for causing the at least a portion of the mediated reality content to be shared with the further device.

According to various, but not necessarily all, embodiments of the invention there is provided an apparatus, comprising: at least one processor; and at least one memory storing computer program code that is configured, working with the at least one processor, to cause the apparatus to perform at least: causing display of mediated reality content by one or more displays associated with a device; identifying a further device with which at least a portion of the mediated reality content is to be shared; determining one or more parameters characterizing one or more displays associated with the further device; determining at least a portion of the mediated reality content to be shared with the further device based, at least in part, on the determined one or more parameters; and causing the at least a portion of the mediated reality content to be shared with the further device.

According to various, but not necessarily all, embodiments of the invention there is provided a method, comprising: causing display of mediated reality content by one or more displays associated with a device; causing at least a portion of the mediated reality content to be shared with a further device; and causing the at least a portion of the mediated reality content to be demarcated by the one or more displays associated with the device prior to, during or after sharing the at least a portion of the mediated reality content with the further device.

According to various, but not necessarily all, embodiments of the invention there is provided computer program code that, when performed by at least one processor, causes at least the following to be performed: causing display of mediated reality content by one or more displays associated with a device; causing at least a portion of the mediated reality content to be shared with a further device; and causing the at least a portion of the mediated reality content to be demarcated by the one or more displays associated with the device prior to, during or after sharing the at least a portion of the mediated reality content with the further device.

One or more computer programs may comprise the computer program code. The one or more computer programs may be stored on one or more non-transitory computer readable mediums.

According to various, but not necessarily all, embodiments of the invention there is provided an apparatus, comprising: means for causing display of mediated reality content by one or more displays associated with a device; means for causing at least a portion of the mediated reality content to be shared with a further device; and means for causing the at least a portion of the mediated reality content to be demarcated by the one or more displays associated with the device prior to, during or after sharing the at least a portion of the mediated reality content with the further device.

According to various, but not necessarily all, embodiments of the invention there is provided an apparatus, comprising: at least one processor; and at least one memory storing computer program code that is configured, working with the at least one processor, to cause the apparatus to perform at least: causing display of mediated reality content by one or more displays associated with a device; causing at least a portion of the mediated reality content to be shared with a further device; and causing the at least a portion of the mediated reality content to be demarcated by the one or more displays associated with the device prior to, during or after sharing the at least a portion of the mediated reality content with the further device.

According to various, but not necessarily all, embodiments of the invention there is provided an apparatus, comprising: at least one processor; and at least one memory storing computer program code that is configured, working with the at least one processor, to cause the apparatus to perform at least: causing display of mediated reality content by one or more displays associated with a device; enabling a user to choose a starting perspective from which the mediated reality content is initially viewed by a further user of a further device, when the mediated reality content is shared with the further device.

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which:

FIGS. 1A-1C and 2A-2C illustrate examples of mediated reality in which FIGS. 1A, 1B, 1C illustrate the same virtual space and different points of view and FIGS. 2A, 2B, 2C illustrate a virtual scene from the perspective of the respective points of view;

FIG. 3A illustrates an example of a real space and

FIG. 3B illustrates an example of a real scene that partially corresponds with the virtual scene of FIG. 1B;

FIG. 9 illustrates a schematic of mediated reality content being displayed;

FIGS. 10A, 10B and 10C illustrate first, second and third schematics of a portion of the mediated reality content being determined for sharing;

FIG. 11A illustrates a user choosing a perspective from which shared mediated reality content is initially viewed by another user;

FIG. 11B illustrates a schematic of mediated reality content being zoomed into and a portion of the mediated reality content being determined for sharing.

DESCRIPTION

Figure 1A:
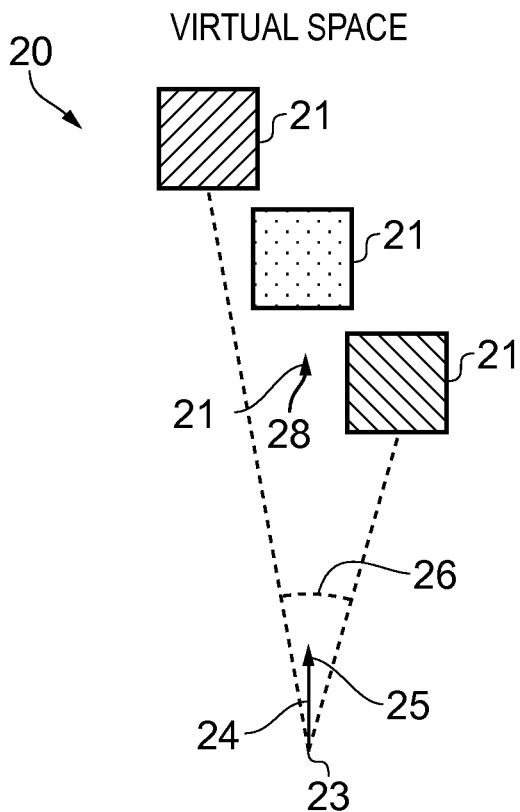

Embodiments of the invention relate to sharing of mediated reality content such as virtual reality content or augmented reality content. For example, mediated reality content may be displayed by one or more displays associated with a device. A further device may be identified with which at least a portion of the mediated reality content is to be shared.

One or more parameters characterizing one or more displays associated with the further device may be used by the device in order to determine a portion of the mediated reality content to be shared with the further device.

For instance, in one example, the device may be a personal computer or a games console connected to a head-mounted viewing device and the further device may be a mobile telephone. The games console/personal computer determines one or more parameters characterizing the one or more displays associated with the mobile telephone and uses the parameter(s) to determine an appropriate portion of the mediated reality content to share with the mobile telephone. For example, the parameter(s) could include a resolution, an aspect ratio, a parameter relating to color reproduction or a display type of the one or more displays of the mobile telephone.

A technical effect of embodiments of the invention is an improved, more efficient way of sharing mediated reality content between devices.

Definitions

In this document, the following definitions apply:

"field of view" refers to extent of the observable world that is visible to a user at a particular instance in time;

"virtual space" refers to fully or partially artificial environment, which may be three dimensional;

"virtual scene" refers to a representation of the virtual space viewed from a particular point of view within the virtual space;

"real space" refers to a real environment, which may be three dimensional;

"real scene" refers to a representation of the real space viewed from a particular point of view within the real space;

"mediated reality" in this document refers to a user visually experiencing a fully or partially artificial environment (a virtual space) as a virtual scene at least partially displayed by a computer to a user. The virtual scene is determined by a point of view within the virtual space and a field of view. Displaying the virtual scene means providing it in a form that can be seen by the user;

"mediated reality content" is content which enables a user to visually experience a fully or partially artificial environment (a virtual space) as a virtual scene. Mediated reality content could include interactive content such as a video game or non-interactive content such as motion video;

"augmented reality" in this document refers to a form of mediated reality in which a user visually experiences a partially artificial environment (a virtual space) as a virtual scene comprising a real scene of a physical real world environment (real space) supplemented by one or more visual elements displayed by an apparatus to a user;

"augmented reality content" is a form of mediated reality content which enables a user to visually experience a partially artificial environment (a virtual space) as a virtual scene. Augmented reality content could include interactive content such as a video game or non-interactive content such as motion video;

"virtual reality" in this document refers to a form of mediated reality in which a user visually experiences a fully artificial environment (a virtual space) as a virtual scene displayed by an apparatus to a user;

"virtual reality content" is a form of mediated reality content which enables a user to visually experience a fully artificial environment (a virtual space) as a virtual scene. Virtual reality content could include interactive content such as a video game or non-interactive content such as motion video;

"perspective-mediated" as applied to mediated reality, augmented reality or virtual reality means that user actions determine the point of view within the virtual space, changing the virtual scene;

"first person perspective-mediated" as applied to mediated reality, augmented reality or virtual reality means perspective mediated with the additional constraint that the user's real point of view determines the point of view within the virtual space;

"user interactive-mediated" as applied to mediated reality, augmented reality or virtual reality means that user actions at least partially determine what happens within the virtual space; and "displaying" means providing in a form that is perceived visually by the user.

DETAILED DESCRIPTION

FIGS. 1A-1C and 2A-2C illustrate examples of mediated reality. The mediated reality may be augmented reality or virtual reality.

Figure 1B:
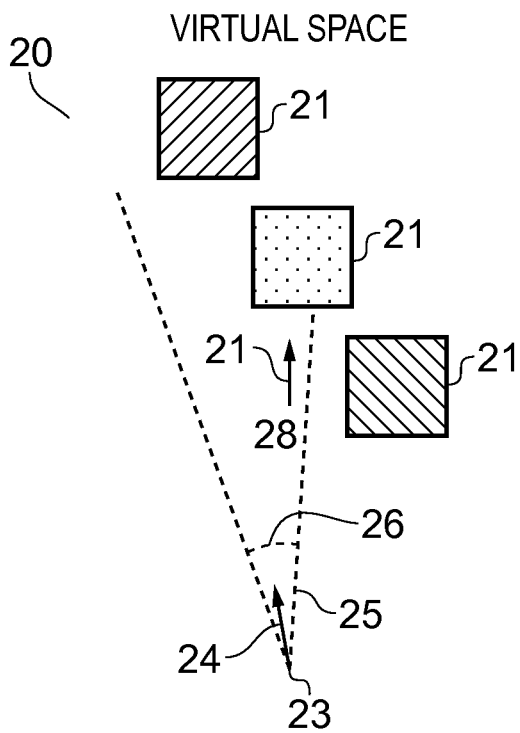

FIGS. 1A, 1B, 1C illustrate the same virtual space 20 comprising the same virtual objects 21, however, each figure illustrates a different point of view 24. The position and direction of a point of view 24 can change independently. The direction but not the position of the point of view 24 changes from FIG. 1A to FIG. 1B. The direction and the position of the point of view 24 changes from FIG. 1B to FIG. 1C.

Figure 2A:
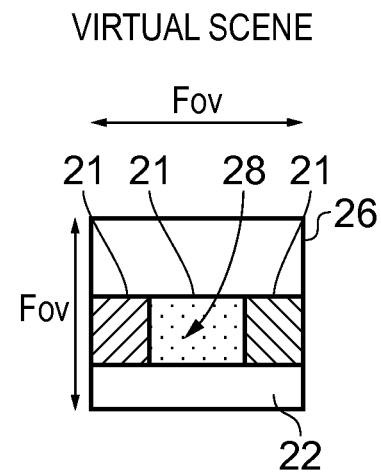
Figure 2B:
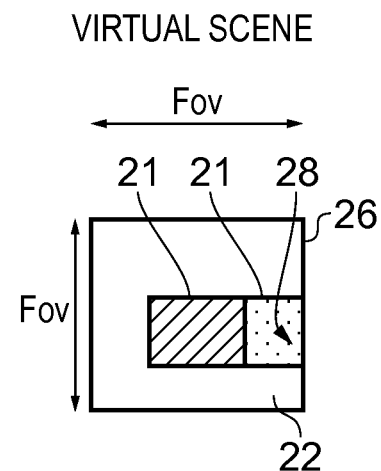

FIGS. 2A, 2B, 2C illustrate a virtual scene 22 from the perspective of the different points of view 24 of respective FIGS. 1A, 1B, 1C. The virtual scene 22 is determined by the point of view 24 within the virtual space 20 and a field of view 26. The virtual scene 22 is at least partially displayed to a user.

The virtual scenes 22 illustrated may be mediated reality scenes, virtual reality scenes or augmented reality scenes. A virtual reality scene displays a fully artificial virtual space 20. An augmented reality scene displays a partially artificial, partially real virtual space 20.

The mediated reality, augmented reality or virtual reality may be user interactive-mediated. In this case, user actions at least partially determine what happens within the virtual space 20. This may enable interaction with a virtual object 21 such as a visual element 28 within the virtual space 20.

The mediated reality, augmented reality or virtual reality may be perspective-mediated. In this case, user actions determine the point of view 24 within the virtual space 20, changing the virtual scene 22. For example, as illustrated in FIGS. 1A, 1B, 1C a position 23 of the point of view 24 within the virtual space 20 may be changed and/or a direction or orientation 25 of the point of view 24 within the virtual space 20 may be changed. If the virtual space 20 is three-dimensional, the position 23 of the point of view 24 has three degrees of freedom e.g. up/down, forward/back, left/right and the direction 25 of the point of view 24 within the virtual space 20 has three degrees of freedom e.g. roll, pitch, yaw. The point of view 24 may be continuously variable in position 23 and/or direction 25 and user action then changes the position and/or direction of the point of view 24 continuously. Alternatively, the point of view 24 may have discrete quantised positions 23 and/or discrete quantised directions 25 and user action switches by discretely jumping between the allowed positions 23 and/or directions 25 of the point of view 24.

FIG. 3A illustrates a real space 10 comprising real objects 11 that partially corresponds with the virtual space 20 of FIG. 1A. In this example, each real object 11 in the real space 10 has a corresponding virtual object 21 in the virtual space 20, however, each virtual object 21 in the virtual space 20 does not have a corresponding real object 11 in the real space 10. In this example, one of the virtual objects 21, the computer-generated visual element 28, is an artificial virtual object 21 that does not have a corresponding real object 11 in the real space 10.

A linear mapping exists between the real space 10 and the virtual space 20 and the same mapping exists between each real object 11 in the real space 10 and its corresponding virtual object 21. The relative relationship of the real objects 11 in the real space 10 is therefore the same as the relative relationship between the corresponding virtual objects 21 in the virtual space 20.

FIG. 3B illustrates a real scene 12 that partially corresponds with the virtual scene 22 of FIG. 1B, it includes real objects 11 but not artificial virtual objects. The real scene is from a perspective corresponding to the point of view 24 in the virtual space 20 of FIG. 1A. The real scene 12 content is determined by that corresponding point of view 24 and the field of view 26.

FIG. 2A may be an illustration of an augmented reality version of the real scene 12 illustrated in FIG. 3B. The virtual scene 22 comprises the real scene 12 of the real space 10 supplemented by one or more visual elements 28 displayed by an apparatus to a user. The visual elements 28 may be a computer-generated visual element. In a see-through arrangement, the virtual scene 22 comprises the actual real scene 12 which is seen through a display of the supplemental visual element(s) 28. In a see-video arrangement, the virtual scene 22 comprises a displayed real scene 12 and displayed supplemental visual element(s) 28. The displayed real scene 12 may be based on an image from a single point of view 24 or on multiple images from different points of view 24 at the same time, processed to generate an image from a single point of view 24.

Figure 4A:
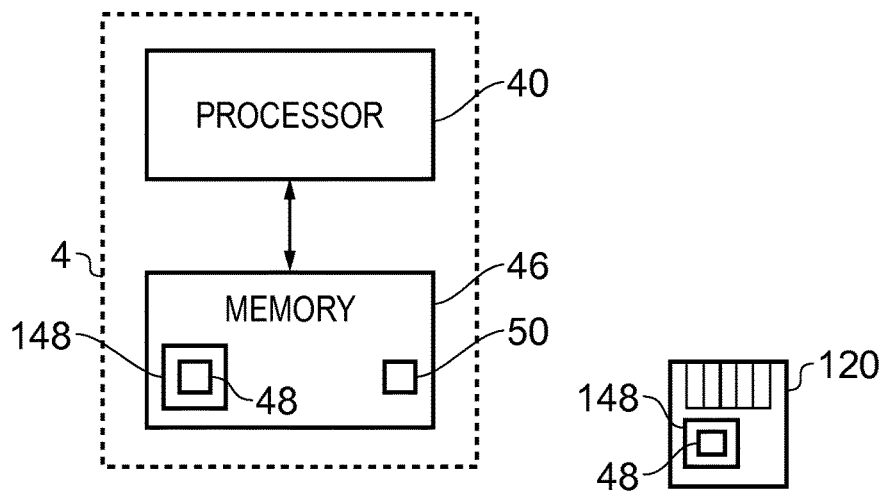
FIG. 4A illustrates a schematic of an apparatus in the form of a chip or chipset.

FIG. 4A illustrates an apparatus 4 in the form of a chip or a chipset. The illustrated apparatus 4 comprises at least one processor 40 and at least one memory 46. The processor(s) 40 might be or include a central processing unit (CPU) and/or a graphics processing unit (GPU). The processor 40 is configured to read from and write to the memory 46. The processor 40 may also comprise an output interface via which data and/or commands are output by the processor 40 and an input interface via which data and/or commands are input to the processor 40.

The memory 46 stores a computer program 148 comprising computer program instructions (computer program code) 48 that controls the operation of the apparatus 4/30 when loaded into the processor 40. The computer program instructions 48, of the computer program 148, provide the logic and routines that enables the apparatus 4/30 to perform the methods illustrated in FIGS. 6A & 6B and 8. The processor 40 by reading the memory 46 is able to load and execute the computer program 48.

The computer program 148 may arrive at the apparatus 4/30 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 148. The delivery mechanism may be a signal configured to reliably transfer the computer program 148. The signal could, for example, be sent over a wireless connection (such as a radio frequency connection) or a wired connection in accordance with one or more protocols. The apparatus 4/30 may cause the computer program 148 to be transmitted as a computer data signal.

Although the memory 46 is illustrated as a single component/circuitry it may be implemented as one or more separate components/circuitry some or all of which may be integrated/removable and/or may provide permanent/semi-permanent/dynamic/cached storage.

Although the processor 40 is illustrated as a single component/circuitry it may be implemented as multiple processors, such as one or more separate components/circuitry some or all of which may be integrated/removable. The processor(s) 40 may be single core or multi-core.

Figure 4B:
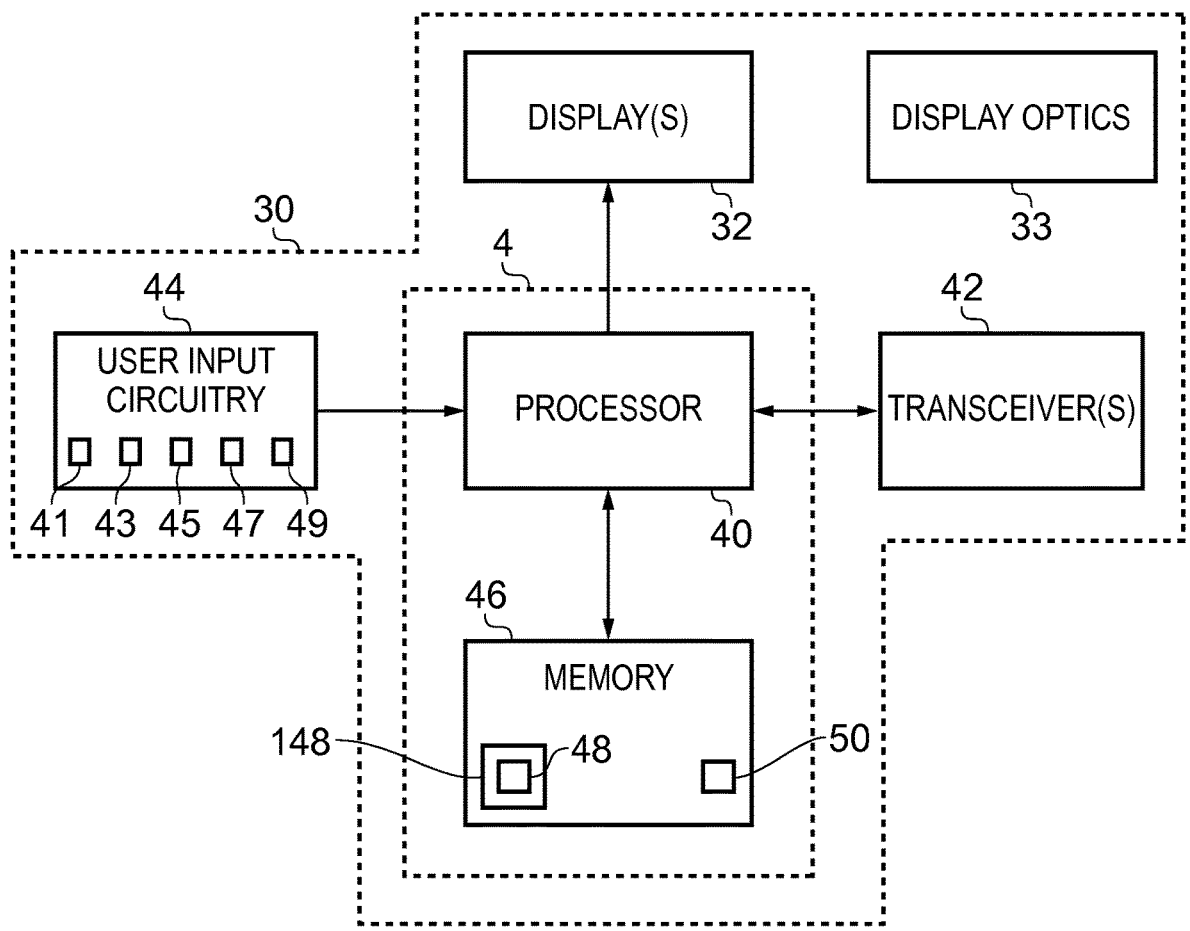
FIG. 4B illustrates a schematic an apparatus in the form of one or more electronic devices that is/are operable to enable mediated reality and/or augmented reality and/or virtual reality.

FIG. 4B illustrates a schematic of an apparatus 30 that is operable to enable mediated reality and/or augmented reality and/or virtual reality.

Figure 5:
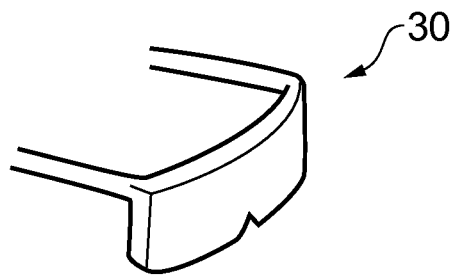
FIG. 5 illustrates an example of a perspective view of an example of the apparatus illustrated in FIG. 4B.

In some embodiments, the apparatus 30 might be a single electronic device such as a head-mounted viewing device. An example of such a head-mounted viewing device is illustrated in FIG. 5.

In other embodiments, the apparatus 30 could be distributed across multiple devices, which may be formed from a combination of a head-mounted viewing device, a games console/personal computer and/or one or more hand-held controllers. Where the apparatus 30 is formed at least in part by a games console or a personal computer, the processor 40 and the memory 46 (or, where multiple processors and/or multiple memories are provided, one or more of either or both) may be provided in the games console/personal computer.

In the illustrated example, the apparatus 30 comprises the apparatus 4 illustrated in FIG. 4A, one or more displays 32, display optics 33, one or more transceivers 42 and user input circuitry 44.

The one or more displays 32 are for providing at least parts of the virtual scene 22 to a user in a form that is perceived visually by the user. Such a virtual scene may form part of mediated reality content, such as virtual reality content or augmented reality content. The display(s) 32 may be one or more visual displays that provides light which displays at least parts of the virtual scene 22 to a user. Examples of visual displays include liquid crystal displays, organic light emitting displays, emissive, reflective, transmissive and transflective displays, direct retina projection display, near eye displays etc. The display(s) 32 is controlled in this example but not necessarily all examples by the processor 40.

If the apparatus 30 comprises a head-mounted viewing device, the display(s) 32 may be positioned close to the user's eyes when the user is wearing the head-mounted viewing device, with the display optics 33 positioned between the user's eyes and the display(s) 32.

The display optics 33 are configured, in conjunction with the display(s) 32, to cause the user to perceive that virtual objects displayed by the display(s) 32 are positioned at a different distance from the user than the distance between the user's eyes and the display(s) 32 itself.

The display optics 33 may be, or include, a fisheye lens for each eye of the user. Each fisheye lens may be configured to produce visual distortion to create a wide panoramic/hemispherical image.

When the head-mounted viewing device is worn by a user, the display optics and the display(s) 32 are such that a first display portion of the display(s) 32 forms images that are conveyed to a first eye of the user and not a second eye, and a second display portion of the display(s) 32 forms images that are conveyed to the second eye of the user and not the first eye.

In some embodiments, a single display 32 is provided for both of the user's eyes. In such embodiments, one portion/half of the display 32 is viewed by the first eye of the user (and not the second eye of the user) when the head-mounted viewing device is worn and the other portion/half 32 is viewed by the second eye of the user (and not the first eye of the user).

In other embodiments, the first display portion is a first display and the second display portion is a second, different, display. In such embodiments, the first display 32 is viewed by the first eye of the user (and not the second eye of the user) when the head-mounted viewing device is worn and the second display 32 is viewed by the second eye of the user (and not the first eye of the user) when the head-mounted viewing device is worn.

The processor 40 may cause the user to perceive a stereoscopic effect by displaying content on the first display portion that is offset in space relative to content displayed on the second display portion. The geometry of virtual objects displayed on the display(s) 32 (if they were viewed, for example, without the aid of the display optics 33) may be different from the geometry of the virtual objects that is perceived by the user when the head-mounted viewing device is worn and the virtual objects are viewed through the display optics 33, due to the optical properties of the display optics 33.

A head-mounted viewing device moves when the head of the user moves. The head-mounted viewing device may be a see-through arrangement for augmented reality that enables a live real scene 12 to be viewed while one or more visual elements 28 are displayed by the display(s) 32 to the user to provide in combination the virtual scene 22. In this case a visor, if present, is transparent or semi-transparent so that the live real scene 12 can be viewed through the visor.

A head-mounted viewing device may be operated as a see-video arrangement for augmented reality that enables a live or recorded video of a real scene 12 to be displayed by the display(s) 32 for viewing by the user while one or more visual elements 28 are simultaneously displayed by the display(s) 32 for viewing by the user. The combination of the displayed real scene 12 and displayed one or more visual elements 28 provides the virtual scene 22 to the user. In this case the visor is opaque and may be used as the display(s) 32.

The one or more transceivers 42 are configured to receive inputs from the processor 40 to provide outputs to the processor 40. For example, the one or more transceivers 42 may receive data from the processor 40 and transmit it, and provide received data to the processor 40.

The one or more transceivers 42 may include one or more wireless transceivers and/or one or more wired transceivers. Such wireless transceivers may, for example, include radio frequency receivers in the form of one or more long range cellular transceivers or short range wireless transceivers (which, for example, may operate in accordance with an Institute of Electrical and Electronic Engineers wireless local area network 802.11 protocol or a Bluetooth protocol). Such wired transceivers may, for example, include a Universal Serial Bus (USB) transceiver.

In the illustrated example, the user input circuitry 44 may comprise one or more tactile sensors 43, one or more point of view sensors 45 one or more image sensors 47 for imaging real space 10 and one or more depth sensors 49.

The one or more tactile sensors 43 may include, for example, one or more joysticks and one or more keys/buttons. The joystick(s) and/or the key(s)/button(s) may form part of a physical, hand-held controller. If the apparatus 30 is head-mounted, at least some of the one or more tactile sensors 43 may be positioned on the head-mounted apparatus.

The apparatus 30 may enable user-interactive mediation for mediated reality and/or augmented reality and/or virtual reality. The user input circuitry 44 detects user actions using user input, such as via the tactile sensor(s) 43. These user actions are used by the processor 40 to determine what happens within the virtual space 20. This may enable interaction with a visual element 28 within the virtual space 20.

The apparatus 30 may enable perspective mediation for mediated reality and/or augmented reality and/or virtual reality. The user input circuitry 44 detects user actions. These user actions are used by the processor 40 to determine the point of view 24 within the virtual space 20, changing the virtual scene 22. The point of view 24 may be continuously variable in position and/or direction and user action changes the position and/or direction of the point of view 24. Alternatively, the point of view 24 may have discrete quantised positions and/or discrete quantised directions and user action switches by jumping to the next position and/or direction of the point of view 24.

The apparatus 30 may enable first person perspective for mediated reality, augmented reality or virtual reality. The user input circuitry 44 detects the user's real point of view 14 using user point of view sensor 45. The user's real point of view is used by the processor 40 to determine the point of view 24 within the virtual space 20, changing the virtual scene 22. Referring back to FIG. 3A, a user 18 has a real point of view 14. The real point of view may be changed by the user 18. For example, a real location 13 of the real point of view 14 is the location of the user 18 and can be changed by changing the physical location 13 of the user 18. For example, a real direction 15 of the real point of view 14 is the direction in which the user 18 is looking and can be changed by changing the real direction of the user 18. The real direction 15 may, for example, be changed by a user 18 changing an orientation of their head or view point and/or a user changing a direction of their gaze. A head-mounted apparatus 30 may be used to enable first-person perspective mediation.

The apparatus 30 may comprise as part of the input circuitry 44 point of view sensors 45 for determining changes in the real point of view.

For example, positioning technology such as GPS, triangulation (trilateration) by transmitting to multiple receivers and/or receiving from multiple transmitters, acceleration detection and integration may be used to determine a new physical location 13 of the user 18 and real point of view 14.

For example, accelerometers, electronic gyroscopes or electronic compasses may be used to determine a change in an orientation of a user's head or view point and a consequential change in the real direction 15 of the real point of view 14.

For example, pupil tracking technology, based for example on computer vision, may be used to track movement of a user's eye or eyes and therefore determine a direction of a user's gaze and consequential changes in the real direction 15 of the real point of view 14.

The apparatus 30 may comprise as part of the input circuitry 44 image sensors 47 for imaging the real space 10.

An example of an image sensor 47 is a digital image sensor that is configured to operate as a camera. Such a camera may be operated to record static images and/or video images In some, but not necessarily all embodiments, cameras may be configured in a stereoscopic or other spatially distributed arrangement so that the real space 10 is viewed from different perspectives. This may enable the creation of a three-dimensional image and/or processing to establish depth, for example, via the parallax effect.

In some, but not necessarily all embodiments, the input circuitry 44 comprises depth sensors 49. A depth sensor 49 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the real space 10 with light, preferably invisible light such as infrared light, with a spatially dependent pattern. Detection of a certain pattern by the receiver allows the real space 10 to be spatially resolved. The distance to the spatially resolved portion of the real space 10 may be determined by time of flight and/or stereoscopy (if the receiver is in a stereoscopic position relative to the transmitter).

Figure 6A:
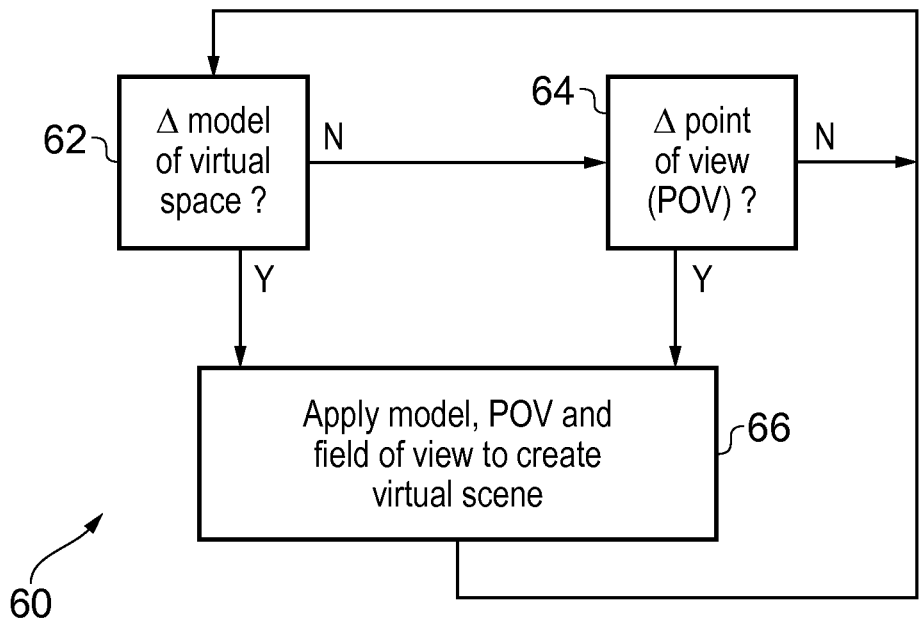
FIG. 6A illustrates an example of a method for enabling mediated reality and/or augmented reality and/or virtual reality.

The apparatus 30 may enable mediated reality and/or augmented reality and/or virtual reality, for example using the method 60 illustrated in FIG. 6A or a similar method. The processor 40 stores and maintains a model 50 of the virtual space 20. The model may be provided to the processor 40 or determined by the processor 40. For example, sensors in input circuitry 44 may be used to create overlapping depth maps of the virtual space from different points of view and a three dimensional model may then be produced.

At block 62 it is determined whether or not the model of the virtual space 20 has changed. If the model of the virtual space 20 has changed the method moves to block 66. If the model of the virtual space 20 has not changed the method moves to block 64.

At block 64 it is determined whether or not the point of view 24 in the virtual space 20 has changed. If the point of view 24 has changed the method moves to block 66. If the point of view 24 has not changed the method returns to block 62.

At block 66, a two-dimensional projection of the three-dimensional virtual space 20 is taken from the location 23 and in the direction 25 defined by the current point of view 24. The projection is then limited by the field of view 26 to produce the virtual scene 22. The method then returns to block 62.

Where the apparatus 30 enables augmented reality, the virtual space 20 comprises objects 11 from the real space 10 and also visual elements 28 not present in the real space 10. The combination of such visual elements 28 may be referred to as the artificial virtual space. FIG. 5B illustrates a method 70 for updating a model of the virtual space 20 for augmented reality.

At block 72 it is determined whether or not the real space 10 has changed. If the real space 10 has changed the method moves to block 76. If the real space 10 has not changed the method moves to block 74. Detecting a change in the real space 10 may be achieved at a pixel level using differentiating and may be achieved at an object level using computer vision to track objects as they move.

At block 74 it is determined whether or not the artificial virtual space has changed. If the artificial virtual space has changed the method moves to block 76. If the artificial virtual space has not changed the method returns to block 72. As the artificial virtual space is generated by the controller 42 changes to the visual elements 28 are easily detected.

At block 76, the model of the virtual space 20 is updated.

In some but not necessarily all embodiments, the input circuitry 44 may comprise communication circuitry 41 in addition to or as an alternative to one or more of the image sensors 47 and the depth sensors 49. Such communication circuitry 41 may communicate with one or more remote image sensors 47 in the real space 10 and/or with remote depth sensors 49 in the real space 10. The communication circuitry 41 may form part of the transceiver(s) 42.

Referring back to FIG. 4B, the apparatus 30 may enable user-interactive mediation for mediated reality and/or augmented reality and/or virtual reality. The user input circuitry 44 detects user actions from user input. These user actions are used by the processor 40 to determine what happens within the virtual space 20. This may enable interaction with a visual element 28 within the virtual space 20.

The detected user actions may, for example, be gestures performed in the real space 10. Gestures may be detected in a number of ways. For example, depth sensors 49 may be used to detect movement of parts a user 18 and/or or image sensors 47 may be used to detect movement of parts of a user 18 and/or positional/movement sensors attached to a limb of a user 18 may be used to detect movement of the limb.

Object tracking may be used to determine when an object or user moves. For example, tracking the object on a large macro-scale allows one to create a frame of reference that moves with the object. That frame of reference can then be used to track time-evolving changes of shape of the object, by using temporal differencing with respect to the object. This can be used to detect small scale human motion such as gestures, hand movement, facial movement. These are scene independent user (only) movements relative to the user.

The apparatus 30 may track a plurality of objects and/or points in relation to a user's body, for example one or more joints of the user's body. In some examples, the apparatus 30 may perform full body skeletal tracking of a user's body.

The tracking of one or more objects and/or points in relation to a user's body may be used by the apparatus 30 in gesture recognition and so on.

Figure 7:
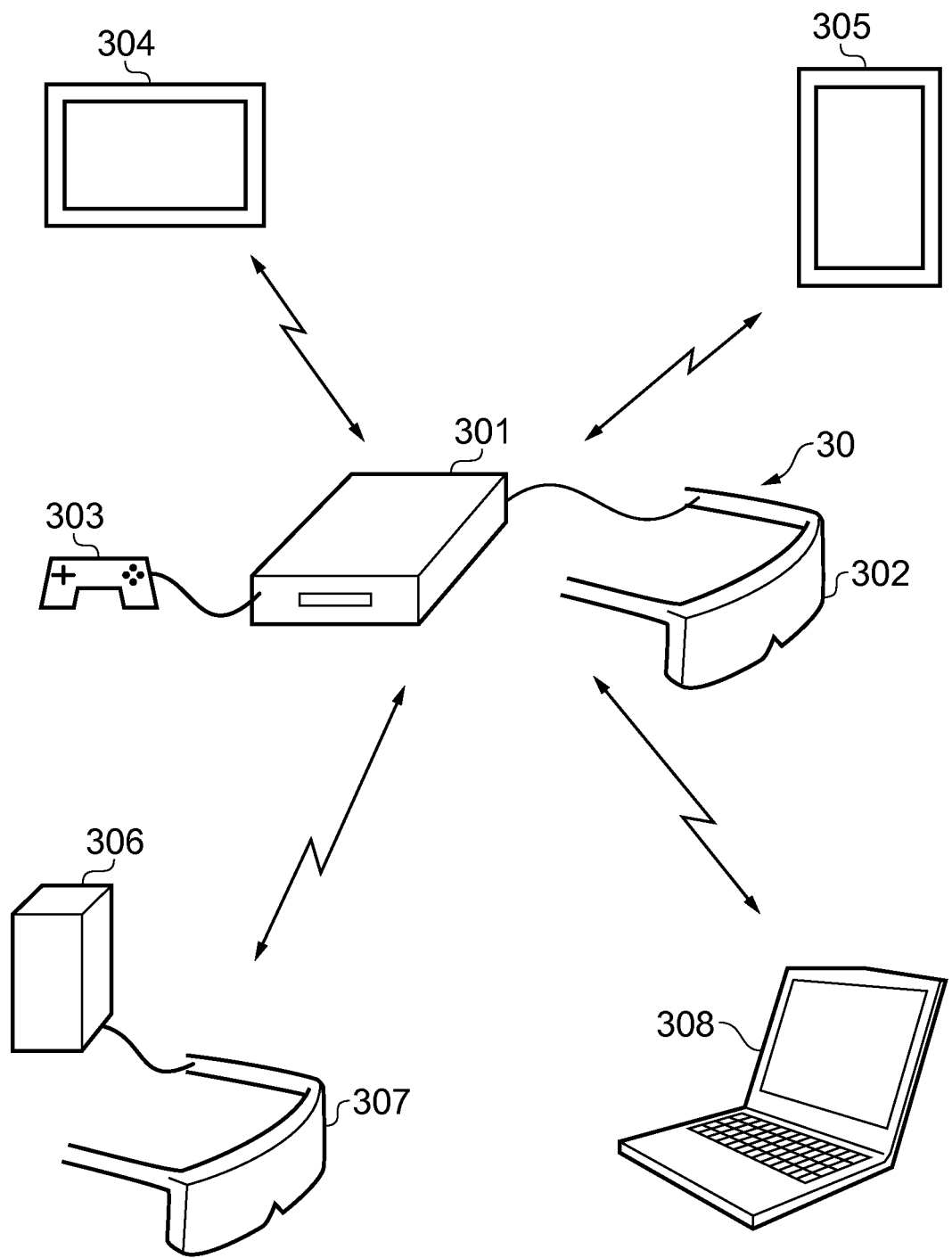
FIG. 7 illustrates the apparatus illustrated in FIG. 4B in communication with one or more devices.

FIG. 7 illustrates a schematic of the apparatus 30 in communication with one or more devices 304, 305, 306, 308. By way of example, in FIG. 7 the apparatus 30 is formed of a first device in the form of a games console 301, a second device 302 in the form of a head mounted viewing device 302 and a third device 303 in the form of a hand-held controller 303 in FIG. 7.

In this example, the processor 40, the memory 46 and the transceiver(s) 42 of the apparatus 30 are provided in the games console 301, the display(s) 32 and the display optics 33 of the apparatus 30 are provided in the head-mounted viewing device 302 and the one or more tactile sensors 43 of the apparatus 30 are provided in the hand-held controller 303.

FIG. 7 illustrates a fourth device in the form of a first mobile telephone 304 orientated in a landscape orientation, a fifth device in the form of a second mobile telephone 305 in a portrait orientation, sixth and seventh devices in the form of a personal computer 306 connected to a head-mounted viewing device 307 and an eighth device in the form of a laptop computer 308. The games console 301 may be in wired or wireless communication with any or all of the devices 304, 305, 307, 308 via the transceiver(s) 42.

A method according to embodiments of the invention will now be described in relation to FIG. 8. In block 801 of FIG. 8, the processor 40 of the games console 301 causes the display(s) 32 of the head-mounted viewing device 302 to display mediated reality content 90.

FIG. 9 illustrates a user 82 viewing (visual) mediated reality content 90 displayed by the display(s) 32 of the head-mounted viewing device 302. A virtual scene is displayed which includes virtual objects. The head-mounted viewing device 302 enables the user 82 to view the mediated reality content 90 in a first person perspective-mediated manner.

In the example described below and illustrated in the figures, the mediated reality content 90 is (visual) virtual reality content that enables the user to experience a fully artificial/virtual environment. In other examples, the mediated reality content 90 could be augmented reality content that enables the user to experience a partially artificial/virtual, partially real environment.

The mediated reality content 90 extends around the user 82 and beyond the field of view of the user 82. This means that it is not possible for the user 82 to see the whole of the displayed mediated reality content 90 at any one instance in time. The mediated reality content 90 may extend 360 degrees around the user 82 in both a horizontal plane and a vertical plane, but this is not shown in FIG. 9 for clarity purposes.

The whole of the mediated reality content 90 need not be displayed at the same time. That is, the angular range over which the mediated reality content 90 may be viewed by the user 82 by moving his head and/or eyes may be greater than the angular range over which the mediated reality content 90 is displayed by the display(s) 32 at a particular instance in time.

Figure 6B:
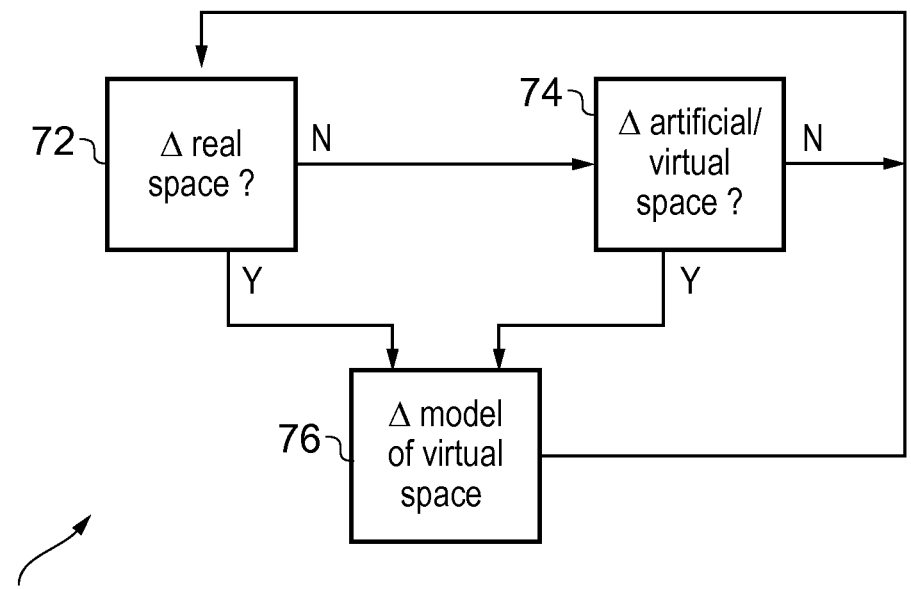
FIG. 6B illustrates an example of a method for updating a model of the virtual space for augmented reality.

As the user 82 experiences the mediated reality content 90, the processor 40 continually cycles through the method illustrated in FIG. 6A and, in the case of augmented reality content, or FIG. 6B.

Figure 8:
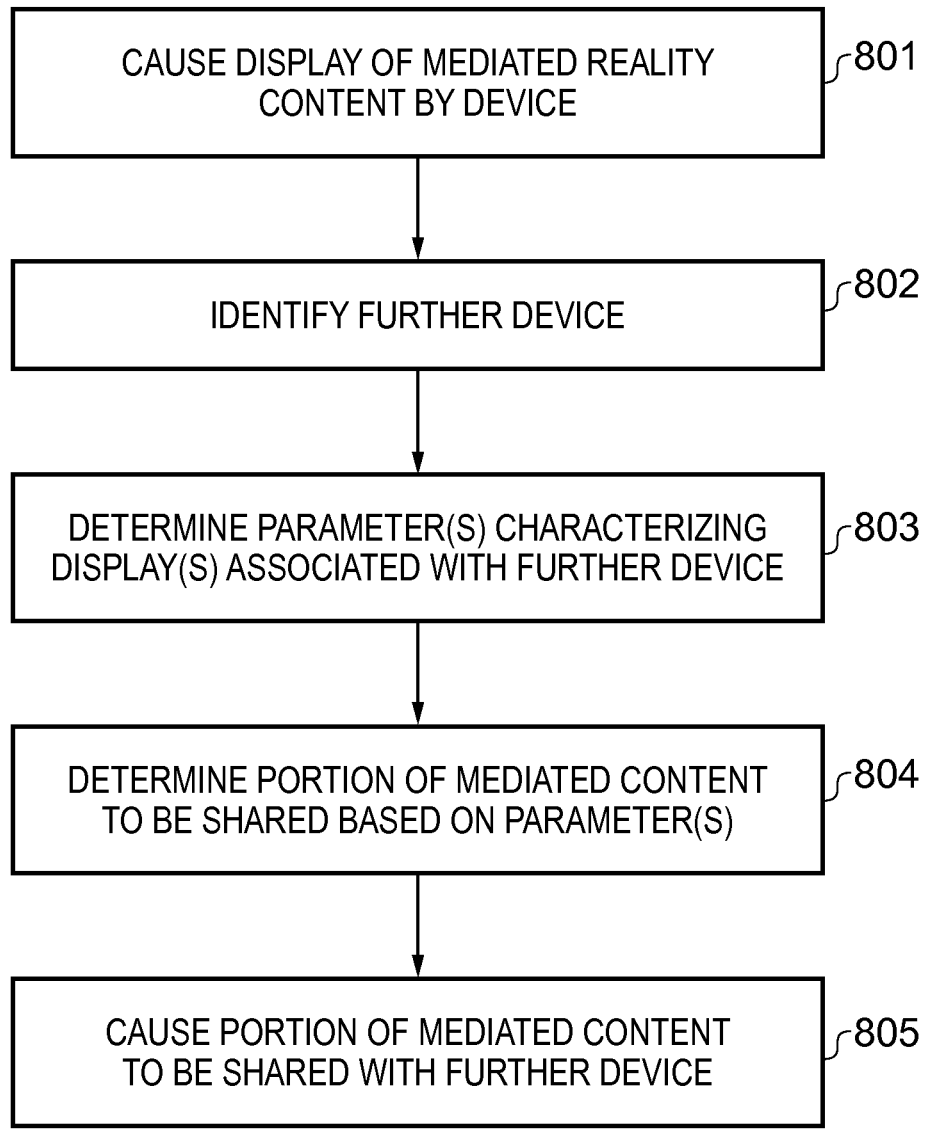
FIG. 8 illustrates a flow chart of a method.

In block 802 of FIG. 8, the games console 301 identifies a further device with which a least a portion of the mediated reality content 90 is to be shared. In this example, the further device is the first mobile telephone 304 in landscape orientation.

The identification of the further device need not occur after the commencement of the display of the mediated reality content 90 by the head-mounted viewing device 302. It could instead occur before the commencement of the display of the mediated reality content 90 by the head-mounted viewing device 302.

In some circumstances, the further device may send a request to the games console 301 to receive shared content, which is received at the transceiver(s) 42 and processed by the processor 40. In such circumstances, content is being "pulled" from the games console 301. In other circumstances, the processor 40 may control the transceiver(s) 42 to scan for devices, such as nearby devices, in order to identify the further device. The transceiver(s) 42 of the games console 301, under the control of the processor 40, may transmit a request to share content with the further device.

The identification of the further device that takes place in block 802 in FIG. 8 may be identification of a device that is already in communication with the games console 301 via the transceiver(s) 42. For example, a communication link may already have been established, but the further device may not have been identified for sharing purposes until block 802 in FIG. 8. Alternatively, the further device may not yet be in communication with the games console 301 when a request to receive shared content is received. In these circumstances, content is being "pushed" by the games console 301.

In block 803, the processor 40 of the games console 301 determines one or more parameters characterizing one or more displays associated with the further device. In this example, the further device is the first mobile telephone 304 which has a single display. The display of the first mobile telephone 304 may, for example, be characterized by parameters such as: a resolution of the display, an aspect ratio of the display, a parameter relating to color reproduction of the display and/or a display type of the display. These parameters may characterize permanent properties of the display, such as those described above, or one or more transient properties, such as a current orientation of the display.

For example, a parameter defining the resolution of the display of the further device may indicate that the resolution of the display is 1280×720 (high definition), 1920×1080 (full high definition), 2560×1440 (quad high definition) or any other resolution. A parameter defining the aspect ratio of the display may indicate that the aspect ratio of the display is 16:9, 4:3 or any other aspect ratio. A parameter relating to color reproduction may indicate whether the display is a color display or a black and white display (such as an electronic-ink display). A parameter defining a display type of the display may indicate that the display is a flat display, a curved display, a non-stereoscopic display, a stereoscopic display, etc.

The one or more parameters may be received in a signal which is transmitted by the first mobile telephone 304, via a wired or wireless connection, to the transceiver(s) 42 of the games console 301. In this example, the processor 40 of the games console 301 determines from the parameters that the display of the first mobile telephone 304 has a 16:9 aspect ratio, a 1280×720 resolution, the display is a color display, the display is flat and the display is currently in a landscape orientation (or that content that is in a landscape orientation is requested by the first mobile telephone 304).

In block 804 in FIG. 8, the processor 40 of the games console 301 determines at least a portion of the mediated reality content 90 to be shared with the further device based on the determined parameters.

In this example, the mediated reality content 90 is rendered for display by the display(s) 32 of the head-mounted viewing device 302 by the processor 40 of the games console 301. The rendering may depend, at least in part, on the resolution(s) of the display(s) 32 of the head-mounted viewing device 302.

The display(s) 32 of the head-mounted viewing device 302 could be of any resolution. By way of example, in this instance the display(s) 32 will be considered to be a single display with a resolution of 7680×2160. A first display portion of the display 32, having a resolution of 3840×2160 is viewed by a first eye of the user 82 (and not the second eye of the user 82) and a second display portion of the display 32, having a resolution of 3840×2160, is viewed by the second eye of the user 82 (and not the first eye of the user 82).

In order to achieve a stereoscopic effect, the images that are displayed by the first display portion of the display 32 are offset in space relative to the images that are displayed by the second display portion of the display 32. Some information/content that is displayed by the first display portion is not displayed by the second display portion. That is, some information/content can be seen by the first eye of the user and not the second eye of the user, and vice versa.

The processor 40 of the games console 301 processes the mediated reality content 90 to identify a portion of the mediated reality content 90 to be shared with the first mobile telephone 304 in dependence upon the parameters which characterize the display of the mobile telephone 304. For example, the processor 40 may identify a portion of the mediated reality content 90 that has the same resolution as the resolution of the display of the first mobile telephone 304.

The determination of the portion of the mediated reality content to be shared with the further device may depend upon the implementation of the apparatus 30. In some implementations, the processor 40 may determine an area, in pixels, of the mediated reality content 90 which is displayed on the display(s) 32 that is of the same resolution as the resolution of the display associated with the further device. The portion of the mediated reality content 90 that is selected may depend on inputs provided by the user via the user input circuitry 44.

In this example, the user provides inputs via the tactile user input sensors 43 of the hand-held controller 303 and selects a portion/area of the mediated reality content 90 on the basis of those inputs. The processor 40 might only obtain content/information that is provided for display on one of the display portions in order to share that content with the first mobile telephone 304. In this example, much of the content that is displayed on the first display portion of the display 32 is replicated on the second display portion of the display 32 to obtain a stereoscopic effect, so it might only be needed to obtain information/content from that which is being provided to one display portion in order to share the selected determined portion of content.

In some implementations, the processor 40 may process the mediated reality content 90 based on the optical properties of the display optics 33 (for example, based on the distortion effect of one or more fisheye lenses), so the mediated reality content 90 is suitable for viewing through display optics 33.

If so, the determined portion of the mediated reality content 90 may be obtained by the processor 40 prior to this processing being performed on the mediated reality content 90, or, alternatively, post processing may be performed on the selected portion of the mediated reality content 90 which is output to the display(s) 32 to account for the optical effects of the display optics 33, prior to the selected portion of mediated reality content 90 being shared with the first mobile telephone 304. Otherwise, the geometry of virtual objects displayed by the display 32 may appear distorted if they were viewed, for instance, without the aid of the display optics 33 on the first mobile telephone 304.

In block 805 in FIG. 8, the processor 40 of the games console 301 causes the portion of mediated reality content 90 to be shared with the further device. For example, the processor 40 of the games console 301 may control the transceiver(s) 42 to transmit the portion of the mediated reality content 90 directly to the first mobile telephone 304 or via one or more networks, such as the internet.

The portion of the mediated reality content 90 that is shared with the further device/first mobile telephone 304 is derived from the mediated reality content 90 that is rendered for display on the head-mounted viewing device 302 by the games console 301.

The portion of the mediated reality content 90 that is shared could be a static image. Alternatively, it could be motion video taken from an interactive video game or non-interactive motion video. In such instances, the games console 301 may continue to provide the portion of the mediated reality content 90 to the first mobile telephone 304 over a period of time.

In some implementations, the user 82 that is viewing the mediated reality content 90 via the head-mounted viewing device 302 may be provided with an indication 101 that demarcates the shared portion of the mediated reality content 90. Such an indication 101 could be provided before, during and/or after sharing. The indication is illustrated in FIG. 10A. In FIG. 10A, the indication 101 has an area which corresponds with the portion of the mediated reality content 90 that is being/will be/has been shared based on the resolution of the display associated with the further device. In this example, the indication 101 illustrated in FIG. 10A corresponds with the portion of the mediated reality content 90 that is being/will be/has been shared based on the resolution of the display of the first mobile telephone 304.

It will be understood by those skilled in the art that the games console 301 may also share a portion of the mediated reality content 90 with the second mobile telephone 305, the personal computer 306 and/or the laptop computer 308 in the manner described above in relation to the sharing of a portion of mediated reality content with the first mobile telephone 304.

Figure 10B:
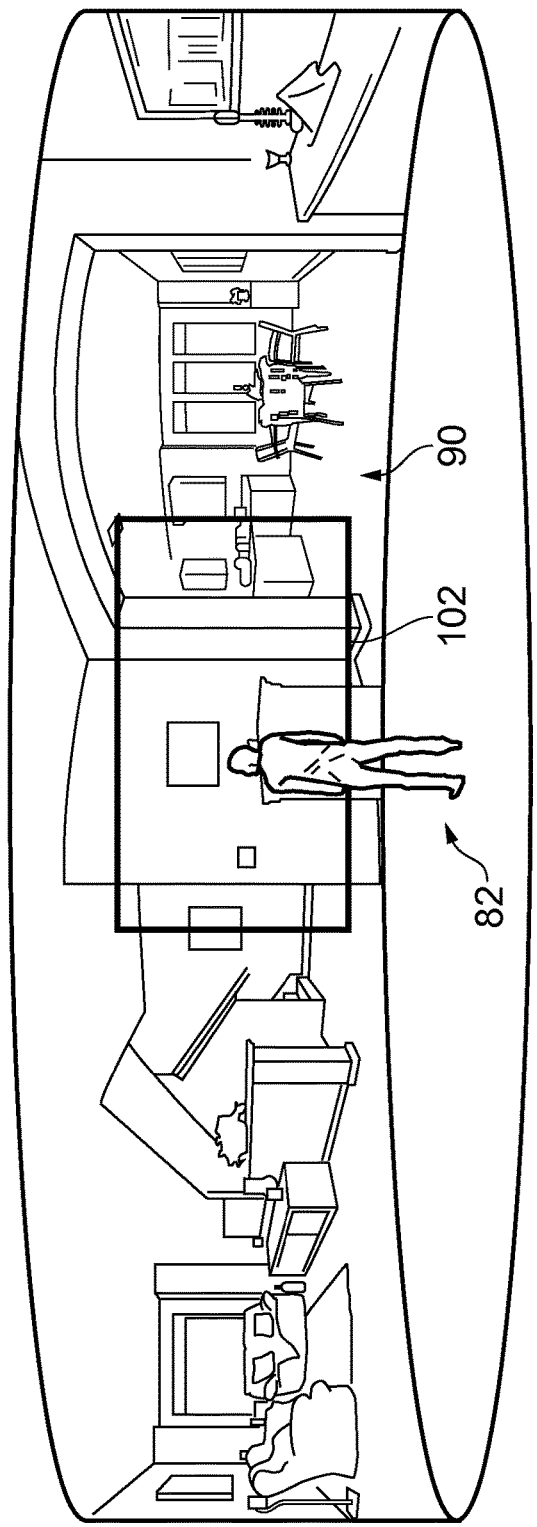

FIG. 10B relates to an example in which a portion of mediated reality content 90 is being shared with the laptop computer 308. In this example, the resolution of the display of the laptop computer is 1920×1080. Since the size of indication 102 of the portion of mediated reality content 90 being shared depends on the resolution of the display of the laptop computer 308, the indication 102 illustrated in FIG. 10B is larger than the indication 101 illustrated in FIG. 10A.

Figure 10C:
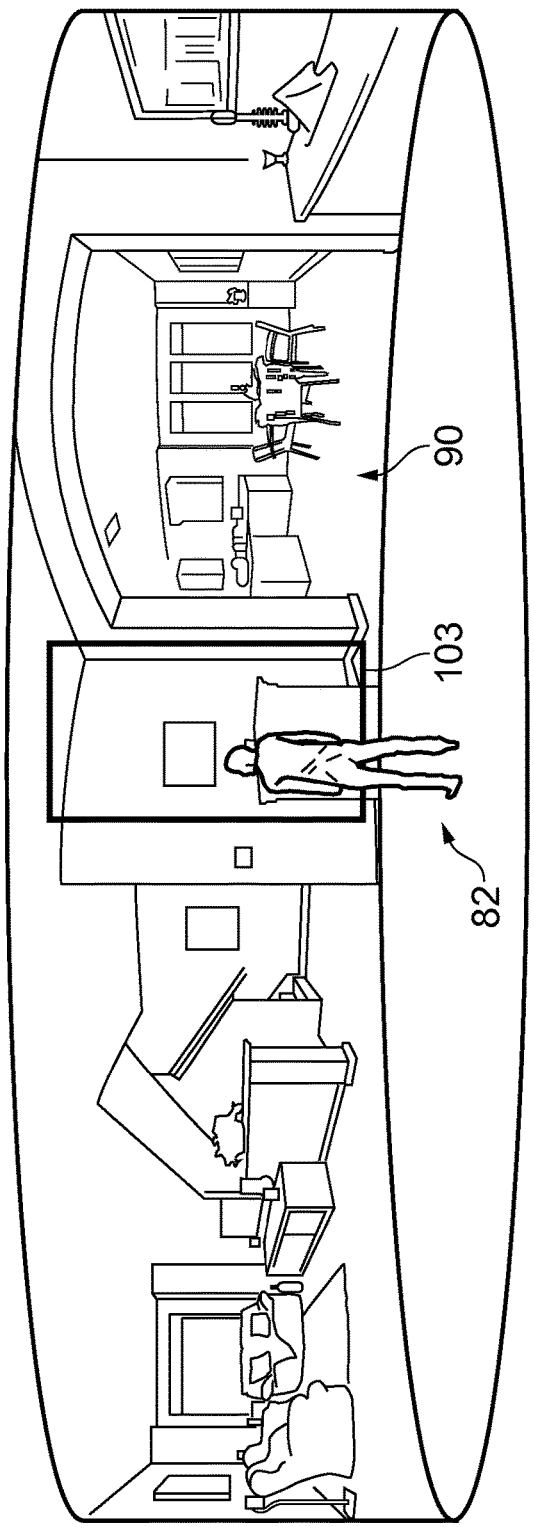

FIG. 10C illustrates an example in which the games console 301 is sharing a portion of mediated reality content 90 with the second mobile telephone 305. The second mobile telephone 305 is in portrait orientation, so the indication 103 of the portion of mediated reality content 90 being shared with the second mobile telephone 305 has a different orientation from the indication 101 illustrated in FIG. 10A. In this example, however, the first mobile telephone 304 and the second mobile telephone 305 have the same resolution, so the size of the indication 103 illustrated in FIG. 10C is the same as the size of the indication 101 illustrated in FIG. 10A.

The personal computer 306 illustrated in FIG. 7 is associated with (in this case, electrically connected to) a head-mounted viewing device 307. The head-mounted viewing device 307 enables a user/wearer to view mediated reality content in a first person perspective-mediated manner. The games console 301 may, for example, share the whole of the mediated reality content 90 with the personal computer 306, such that the mediated reality content 90 is displayed by the head-mounted viewing device 307 in the same manner that is displayed by the head-mounted viewing device 302. The shared mediated reality content 90 that is displayed on the head-mounted viewing device 307 connected to the personal computer 306 is, however, rendered by the games console 301.

FIG. 11A illustrates a reticule 104 that the user 82 of the games console 301 and the head-mounted viewing device 302 may guide, for instance, using the one or more tactile sensors 43, to choose a starting perspective/point of view for another user when the mediated reality content 90 is shared.

This could be done by selecting a particular object of interest in the mediated reality content 90. In the embodiment illustrated in FIG. 11A, the whole of the mediated reality content 90 may be shared.

If, for example, the mediated reality content 90 is shared with the personal computer 306 and displayed by the head-mounted viewing device 307, the perspective/point of view of the mediated reality content 90 that the user of the head-mounted viewing device 307 is initially provided with is that which was chosen by the user 82 of the head mounted viewing device 302. The user of the head-mounted viewing device 307 may therefore initially see an object of interest in the mediated reality content 90 that was chosen by the user 82.

In some embodiments, it may be possible for the user to provide inputs, for example, via the one or more tactile sensors 43, to cause the processor 40 to zoom into the mediated reality content 90 before a portion of the mediated reality content 90 is selected for sharing. For instance, the user 82 may, for instance, use the one or more tactile sensors 43, to choose a section of the mediated reality content 90 to zoom into. This magnifies the mediated reality content 90 to the user 82. A magnified portion of the mediated reality content 90 may then be selected for sharing. Selection of a magnified portion of the mediated reality content 90 for sharing with a further device may result in the shared portion having a lower resolution than the resolution of the display associated with the further device.

FIG. 11B illustrates an example where the dotted box 103 indicates the resolution of the display associated with the further device, relative to the display(s) 32 being used to display the mediated reality content 90. In this example, the user has zoomed into the area labeled with the reference numeral 104. The processor 40 causes the display(s) 32 to display a magnified version 105 of the area 104 to demonstrate to the user 82 how the magnified area would appear on the display associated with the further device.

The processor 40 may demonstrate how the portion of the mediated reality content 90 would appear when it is displayed by the display of the further device in other ways. For instance, if the display associated with the further device were a black and white display, the portion of the mediated reality content 90 that is to be shared, is being shared or has been shared may be displayed in black and white to the user by the display(s) 32 of the head-mounted viewing device 302, under the control of the processor 40 of the games console 301.

Figure 12A:
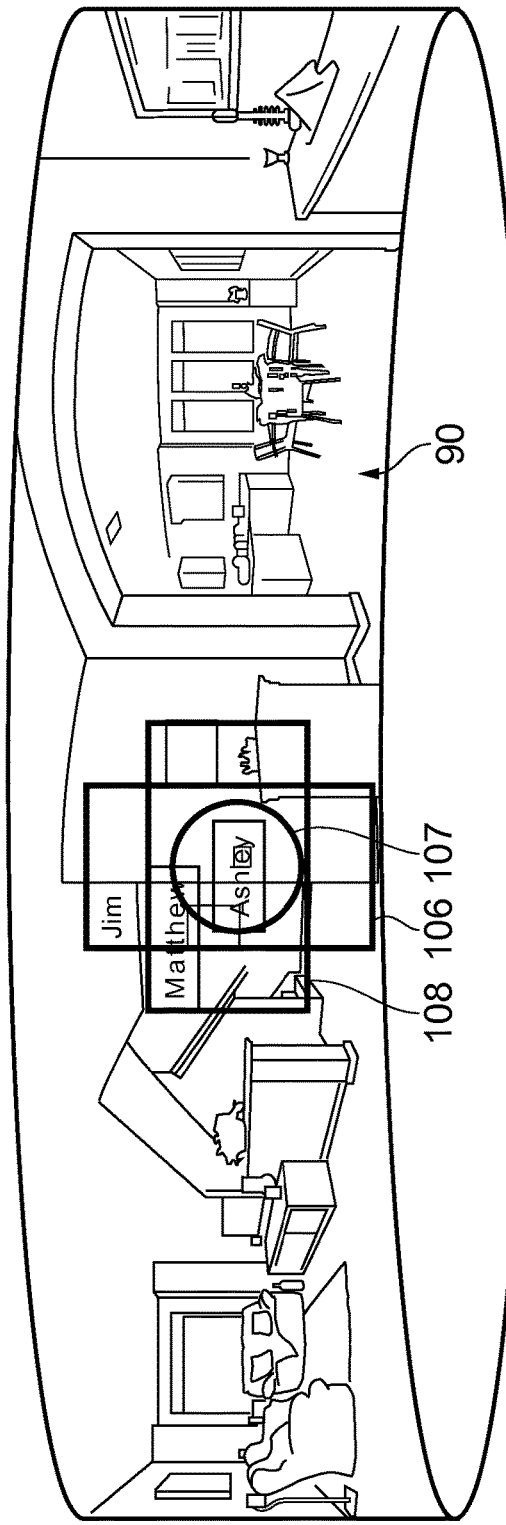
FIGS. 12A and 12B illustrate a portion of the mediated reality content being demarcated prior to, during or after sharing the portion of the mediated reality content.

In some embodiments of the invention, it is possible for the apparatus 30 to share different portions of the mediated reality content 90 with different devices at the same time. The different portions being shared may be demarcated by the display(s) 32. FIG. 12A illustrates an example in which different portions of mediated reality content are being shared with different devices at the same time. The indicator labeled with the reference numeral 106 indicates a portion of the mediated reality content 90 that is being shared with a device associated with a user named "Jim". The indicator labeled with the reference numeral 107 indicates a portion of the mediated reality content 90 that is being shared with a device associated with a user named "Ashley". The indicator labeled with the reference numeral 108 indicates a portion of the mediated reality content 90 that is being shared with a device associated with a user named "Matthew".

As can be seen in FIG. 12A, there is some overlap between the content that is being shared with each of the devices in the example illustrated in FIG. 12A.

Figure 12B:
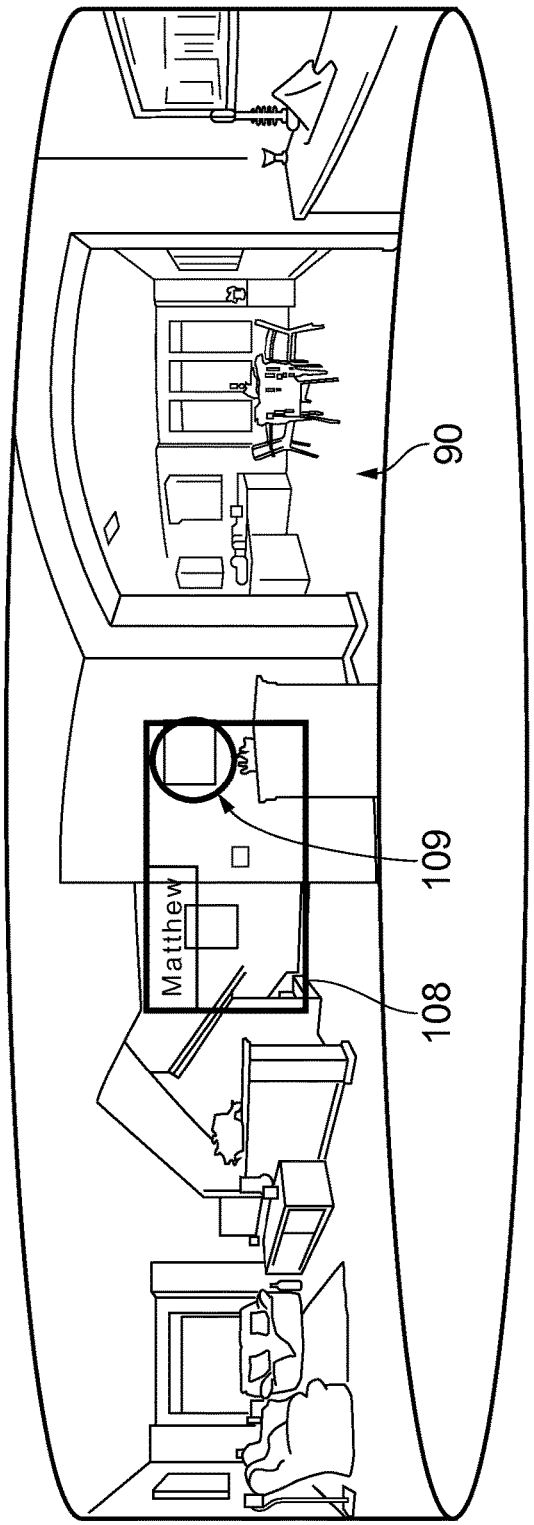

In some instances, different portions of the mediated reality content 90 may be shared with different devices that are associated with the same user. This is illustrated in FIG. 12B, where an indicator 108 illustrates content being shared with a mobile telephone associated with the user "Matthew" and the indicator 109 indicates a portion of content being shared with a smart watch that is also associated with the user "Matthew".

The blocks illustrated in the FIGS. 6A, 6B and 8 may represent steps in a method and/or sections of code in the computer program 148. The illustration of a particular order to the blocks does not necessarily imply that there is a required or preferred order for the blocks and the order and arrangement of the block may be varied. Furthermore, it may be possible for some blocks to be omitted.

References to 'computer-readable storage medium', or a 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Where a structural feature has been described, it may be replaced by means for performing one or more of the functions of the structural feature whether that function or those functions are explicitly or implicitly described.

Although embodiments of the present invention have been described in the preceding paragraphs with reference to various examples, it should be appreciated that modifications to the examples given can be made without departing from the scope of the invention as claimed. For example, it will be apparent to those skilled in the art that the apparatus 30 need not be a combination of a games console 301, a head-mounted viewing device 302 and a hand-held controller 303 as described above. It could, for example, be a combination of a personal computer and a head-mounted viewing device, or merely a head-mounted viewing device.

In some embodiments, the display(s) 32 might be holographic. In such embodiments, a head-mounted viewing device might not be required.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

We claim:

1. A method, comprising:
   causing display of mediated reality content by one or more first displays of a head-mounted viewing device, the one or more first displays being viewable through display optics of the head-mounted viewing device;
   identifying a further device with which a portion of the mediated reality content is to be shared;
   determining one or more parameters of one or more second displays associated with the further device;
   determining a portion of the mediated reality content to be shared with the further device based at least in part on the one or more parameters of the second display associated with the further device;
   causing display in an area of the one or more first displays of the portion of the mediated reality content to be shared with the further device, the displayed portion reflecting the one or more parameters of the one or more second displays associated with the further device; and
   causing the portion of the mediated reality content to be shared with the further device.

2. The method as claimed in claim 1, wherein the head-mounted viewing device enables the mediated reality content to be viewed in a first person perspective mediated manner.

3. The method as claimed in claim 1, wherein post processing is performed on the portion of the mediated reality content that is shared with the further device prior to causing the portion of the mediated reality content to be shared with the further device.

4. The method as claimed in claim 1, wherein the one or more parameters characterize an orientation of the one or more second displays associated with the further device, and the portion of the mediated reality content that is to be shared with the further device is determined, at least in part, based on an orientation of the one or more second displays associated with the further device.

5. The method as claimed in claim 1, wherein the determining the portion of the mediated reality content to be shared with the further device comprises determining an area on the one or more second displays.

6. The method as claimed in claim 1, wherein the one or more parameters comprise a resolution of the one or more second displays associated with the further device, an aspect ratio of the one or more second display associated with the further device, a parameter relating to color reproduction of the one or more second displays associated with the further device, or a display type of the one or more second displays associated with the further device.

7. The method as claimed in claim 1, further comprising: causing the portion of the mediated reality content to be demarcated prior to, during or after sharing the portion of the mediated reality content with the further device.

8. The method as claimed in claim 1, wherein the determination of the mediated reality content to be shared with the further device is further based on a user selection made when viewing the mediated reality content displayed by the one or more first displays through the display optics of the head-mounted viewing device.

9. The method as claimed in claim 8, wherein enabling the user of the head-mounted viewing device to select the portion of the mediated reality content to be shared with the further device comprises enabling the user to zoom into the mediated reality content to perform a selection.

10. The method as claimed in claim 1, further comprising: determining one or more parameters characterizing one or more second displays associated with another device; determining a further portion of the mediated reality content to be shared with the another device based on the determined one or more parameters causing the further portion of the mediated reality content to be shared with the another device.

11. The method as claimed in claim 1 further comprising: performing post-processing on the mediated reality content prior to being shared with the further device such that visual distortions are removed.

12. An apparatus comprising at least one processor and at least one memory, the memory comprising machine-readable instructions, that when executed cause the apparatus to:
display mediated reality content by one or more first displays of a head-mounted device, the one or more first displays being viewable through display optics of the head-mounted viewing device;
identify a further device with which a portion of the mediated reality content is to be shared;
determine one or more parameters of one or more second displays associated with the further device;
determine a portion of the mediated reality content to be shared with the further device based at least in part on the one or more parameters of the second display associated with the further device;
cause display in an area of the one or more first displays of the portion of the mediated reality content to be shared with the further device, the displayed portion reflecting the one or more parameters of the one or more second displays associated with the further device; and
cause the portion of the mediated reality content to be shared with the further device.

13. The apparatus of claim 12, wherein the head-mounted viewing device enables the mediated reality content to be viewed in a first person perspective mediated manner.

14. The apparatus of claim 12, wherein post processing is performed on the portion of the mediated reality content that is shared with the further device prior to causing the portion of the mediated reality content to be shared with the further device.

15. The apparatus of claim 12, wherein the one or more parameters characterize an orientation of the one or more second displays associated with the further device, and the portion of the mediated reality content that is to be shared with the further device is determined, at least in part, based on an orientation of the one or more second displays associated with the further device.

16. The apparatus of claim 12, wherein the determining the portion of the mediated reality content to be shared with the further device comprises determining an area on the one or more second displays.

17. The apparatus of claim 12, wherein the one or more parameters comprise a resolution of the one or more second displays associated with the further device, an aspect ratio of the display associated with the further device, a parameter relating to color reproduction of the one or more second displays associated with the further device or a display type of the one or more second displays associated with the further device.

18. The apparatus of claim 12, further caused to: cause the portion of the mediated reality content to be demarcated prior to, during or after sharing the portion of the mediated reality content with the further device.

19. The apparatus of claim 12, wherein the determination of the mediated reality content to be shared with the further device is further based on a user selection made when viewing the mediated reality content displayed by the one or more first displays through the display optics of the head-mounted viewing device, wherein the user selection comprises zooming into the mediated reality content to perform a selection.

20. At least one non-transitory computer readable medium comprising instructions that, when executed, perform:
display mediated reality content by one or more first displays of a head-mounted device, the one or more first displays being viewable through display optics of the head-mounted viewing device;
identify a further device with which a portion of the mediated reality content is to be shared;
determine one or more parameters of one or more second displays associated with the further device;
determine a portion of the mediated reality content to be shared with the further device based at least in part on the one or more parameters of the second display associated with the further device;
cause display in an area of the one or more first displays of the portion of the mediated reality content to be shared with the further device, the displayed portion reflecting the one or more parameters of the one or more second displays associated with the further device; and
cause the portion of the mediated reality content to be shared with the further device.

* * * * *